V. BARTOS.
SLED PROPELLER.
APPLICATION FILED DEC. 29, 1909.
968,525.
Patented Aug. 30, 1910.
3 SHEETS—SHEET 1.
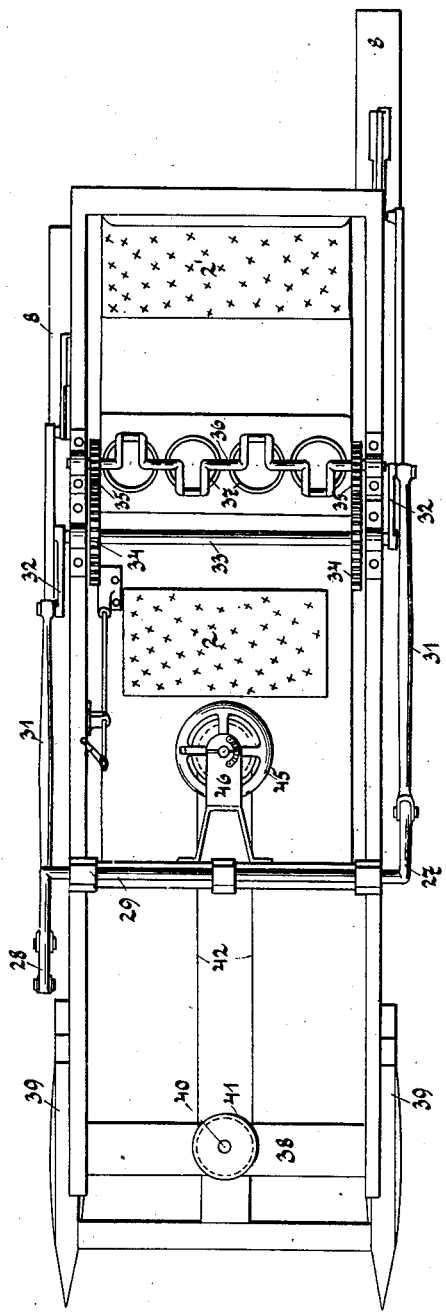
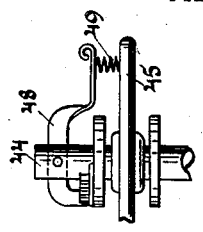
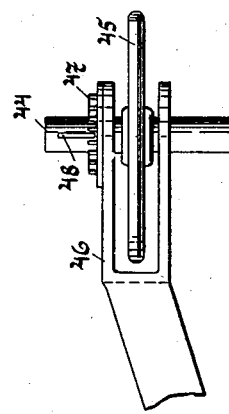
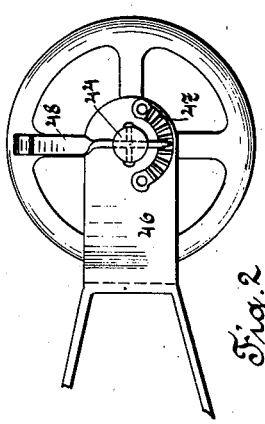
Witnesses:
Carl R. Aberle
B. G. Richards
Inventor:
Vincent Bartos
by Joshua R. H. York
his Attorney.

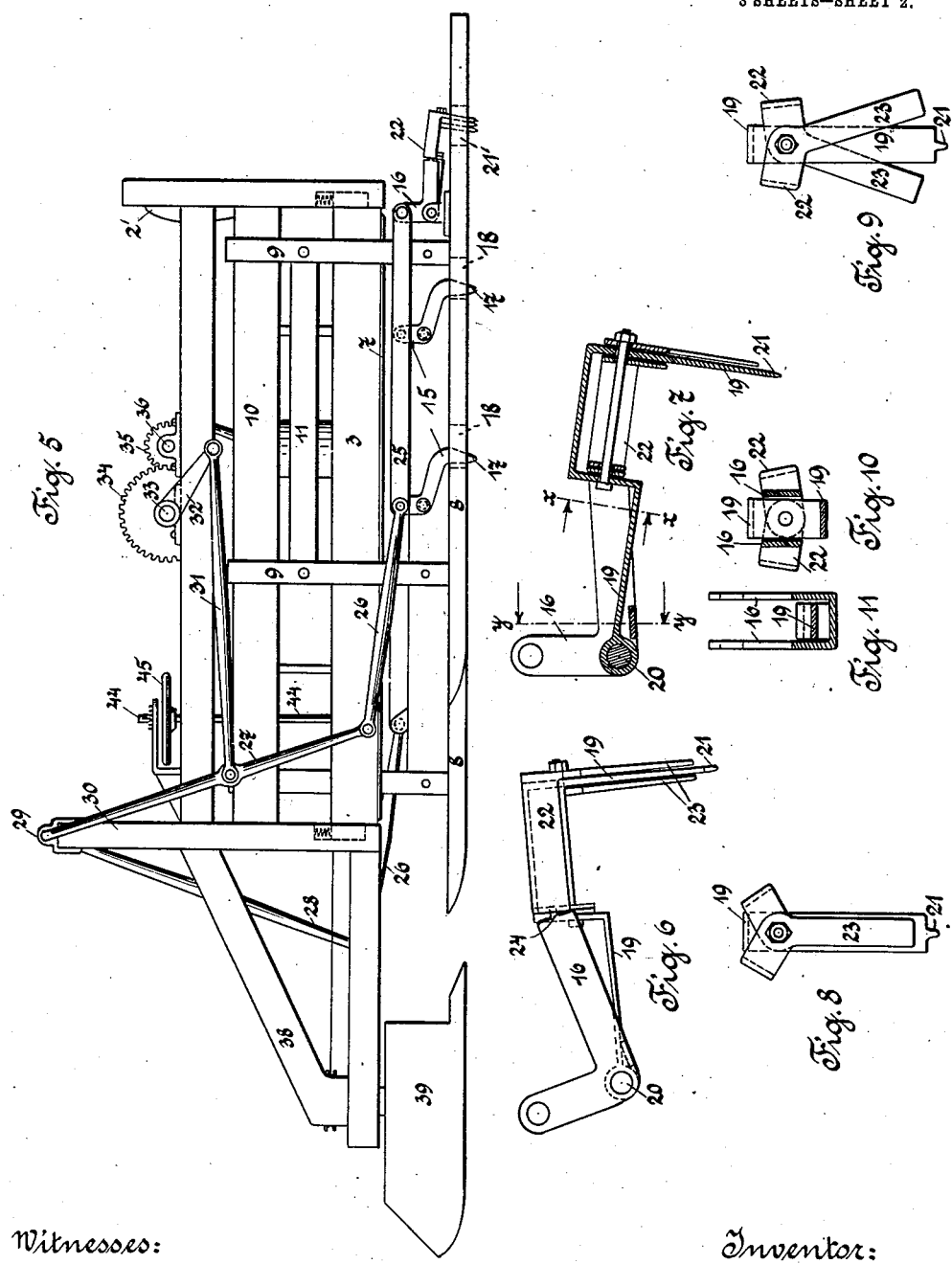

V. BARTOS.
SLED PROPELLER.
APPLICATION FILED DEC. 29, 1909.
968,525.
Patented Aug. 30, 1910.
3 SHEETS—SHEET 3.
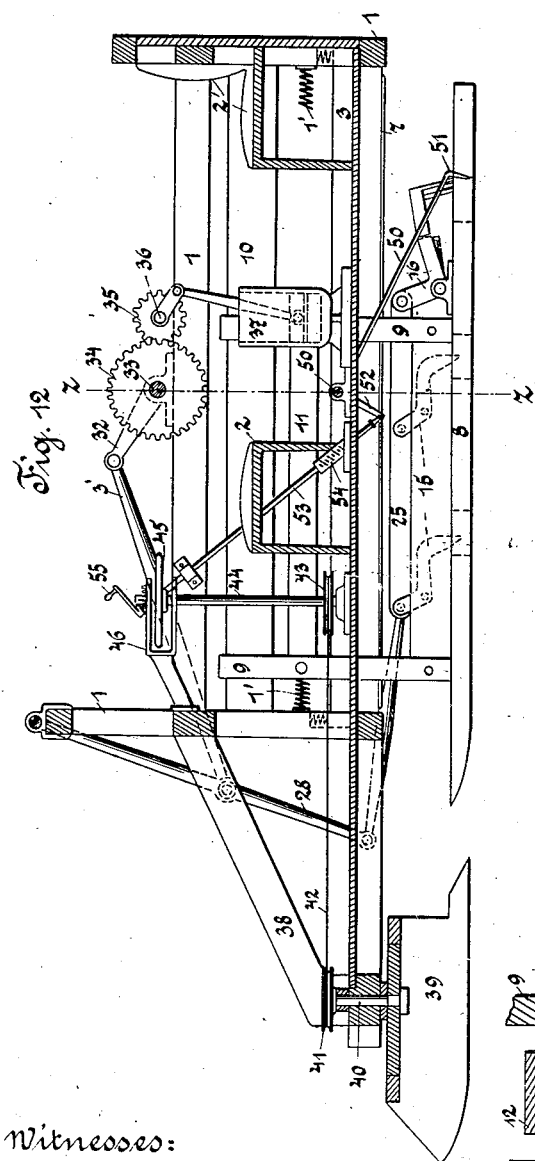
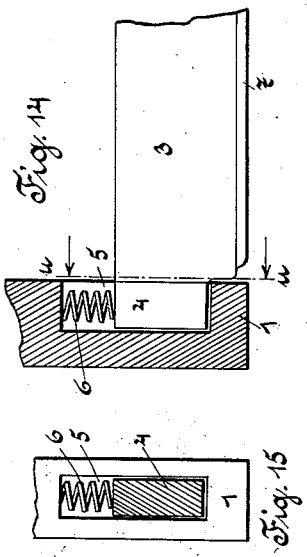
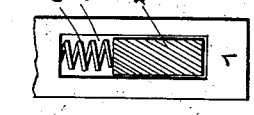
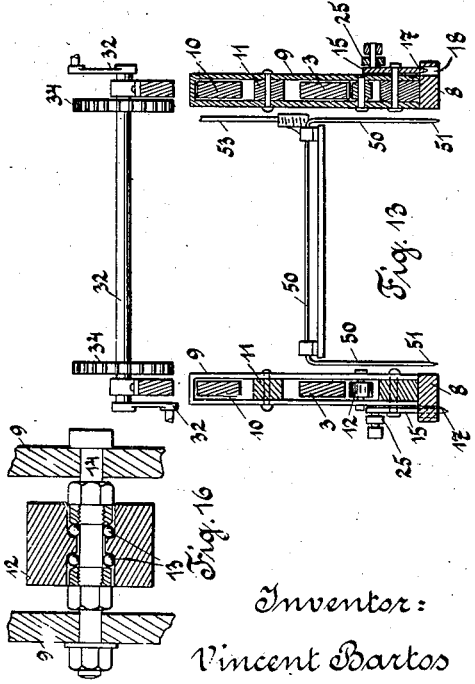
Witnesses:
Carl R. Aberle
B. G. Richards
Inventor:
Vincent Bartos
by Joshua R. H. Potts
his Attorney.

UNITED STATES PATENT OFFICE.

VINCENT BARTOS, OF CHICAGO, ILLINOIS.

SLED-PROPELLER.

968,525.  Specification of Letters Patent.  Patented Aug. 30, 1910.

Application filed December 29, 1909. Serial No. 535,458.

*To all whom it may concern:*

Be it known that I, VINCENT BARTOS, a citizen of the United States, residing at Chicago, county of Cook, and State of Illinois, have invented certain new and useful Improvements in Sled-Propellers, of which the following is a specification.

My invention relates to improvements in sled propellers and has for its object the production of propelling means for sleds which shall be of simple construction and efficient in operation.

The invention consists in the combination and arrangement of parts hereinafter described and claimed.

My invention will be best understood by reference to the accompanying drawings forming a part of this specification, and in which, Figure 1 is a top plan view of a sled provided with propelling mechanism embodying my invention, Fig. 2, an enlarged top plan view of the steering wheel of said sled, Fig. 3, an elevation of Fig. 2, Fig. 4, a partial elevation at right angles to Fig. 3, Fig. 5, a side elevation of the sled, Fig. 6, an enlarged side elevation of one of the stop dogs employed for preventing retrograde movements of the runners of the sled, Fig. 7, a longitudinal section of Fig. 6, Fig. 8, an end view of Fig. 6 showing the dog in inoperative position, Fig. 9, an end view of the same showing the dog in operative position, Fig. 10, a section on line $x$—$x$ of Fig. 7, Fig. 11, a section on line $y$—$y$ of Fig. 7, Fig. 12, a longitudinal section of the sled, Fig. 13, a partial section on line $z$—$z$ of Fig. 12, Fig. 14, an enlarged sectional elevation illustrating the mounting of one end of a bearing rail of the sled, Fig. 15, a section on lines $u$—$u$ of Fig. 14, and Fig. 16, an enlarged section of a bearing roller employed in the construction.

The preferred form of construction as illustrated in the drawings comprises a suitable frame 1 forming the body of the sled and provided with suitable seats 2 and 2' for the accommodation of passengers. The sled body is provided with bearing rails 3 which have lugs 4 at each end engaging into notches 5 in members of frame 1. A spring 6 is imprisoned between the upper side of lugs 4 and the top of notches 5 and serves to yieldingly support the sled body on said bearing rails. Rails 3 are provided with bearing strips 7 on their under sides.

The runners 8 of the sled are supported by a pair of hangers 9 taking over rail 10 of the sled body and connected together by bar 11. Rollers 12 carried by hangers 9 bear against the under side of bearing strips 7 on rail 3 at each side. Rollers 12 are preferably mounted on ball bearings 13 on shaft 14 secured in hangers 9. Buffer springs 1' are secured to frame 1 at either end and on each side to contact with the ends of bars 11 at either end of the movement of the runners and thus act as buffers for said movement. By this construction it will be seen that the sled body will be yieldingly supported upon runners 8 and that said runners are capable of reciprocation relatively to said body.

Stop dogs 15 and 16 are pivoted to runners 8. Stop dogs 15 consist of angular members having pointed lower ends 17 adapted to pass through notches 18 in the runners and engage the surface upon which said runners rest to prevent retrograde movement of said runners. Stop dogs 16 comprise a stirrup frame in which a central bearing piece 19 is mounted upon pivot 20. At its outer and lower end bearing piece 19 carries a point 21 adapted to pass through a slot 21' in runner 8 and engage a surface beneath said runner. Angular frames 22 are pivoted to bearing member 19 and have downwardly depending arms 23 adapted to swing to either side of the outer end portion of piece 19. The ends of the stirrup piece of the stop dog are provided with lugs 24 engaging the inner ends of frames 22. By this construction it will be seen that when dog 16 is rocked to cause the point 21 of bearing piece 19 to press against a surface beneath runner 8, frames 22 will be rocked upon their pivot to cause downwardly depending arms 23 to swing outwardly at either side of piece 19 as shown in Fig. 9. In case the sled is running over soft snow or the like, the spreading out of arms 23 will afford increased resistance to retrograde movement of a runner 8.

At their upper ends dogs 15 and 16 on each of the runners 8 are pivoted to a bar 25 connected by means of a link 26 with the lower ends of lever arms 27 and 28. These lever arms are preferably carried by a shaft 29 rotatably mounted across the top of the forward upright 30 of frame 1, and are angularly disposed toward each other as shown in Fig. 5. Each of the arms 27 and 28 is connected by means of a connecting rod 31 with a crank arm 32 on shaft 33 rotatably mounted in frame 1. Shaft 33 carries gears 34 meshing with gears 35 on crank shaft 36 also rotatably mounted in frame 1. Crank shaft 36 is driven by a suitable gasolene engine 37 or other suitable source of power. By this construction it will be seen that upon rotation of shaft 33 lever arms 27 and 28 will be operated to cause alternate reciprocations of runners 8 relatively to sled body. The motion from said levers is first communicated to stop dogs 15 and 16 causing said dogs to be depressed to engage the ice or other bearing surface upon which the sled is traveling. This prevents retrograde movement of said runners and consequently the force of the engine is exerted to cause forward travel of said body while the runner stands still. The arrangement is such that runners 8 are operated alternately so that while one runner remains stationary to afford a reaction for the forward travel of the sled the other runner is carried forward to assume a new position and to continue the foward movement of the sled during the forward travel of the first runner. Thus it will be seen that the sled will be continually and powerfully urged forward.

At the front the sled body is provided with a forward extension 38 carrying a steering sled 39 pivoted thereto on a shaft 40. At its upper end shaft 40 carries a pulley 41 over which passes a belt or rope 42 also engaging a pulley 43 on shaft 44 in the body of the sled and convenient of access from seat 2. At its upper end shaft 44 carries a steering wheel 45 partially embraced by a supporting bracket 46. An annular set of teeth 47 are secured to the top of bracket 46 and are adapted to coöperate wth a lever 48 pivoted in the top of shaft 44 to secure said steering wheel in different angular positions. A spring 49 serves to normally hold said lever in engagement with said teeth but permits ready disengagement by the operator when it is desired to change the course of the sled. By this arrangement it will be seen that a course of the sled may be readily directed by an operator seated on seat 2.

The speed of the sled may be checked by means of a brake mechanism which comprises a substantially U-shaped lever 50 pivoted in the body of the sled and having its downwardly extending limbs provided with short points 51 adapted to engage the surface over which the sled travels to retard the forward movement thereof. Lever 50 carries a crank arm 52 pivoted to a rod 53 threaded in a socket 54 and has an operating handle 55 at its upper end. By this construction it will be seen that the engaging point 51 may be depressed or elevated as desired.

While I have illustrated and described the preferred form of construction for carrying my invention into effect this is capable of variation or modification without departing from the spirit of the invention. I, therefore, do not wish to be limited to the exact details of construction set forth but desire to avail myself of such variations and modification as come within the scope of the appended claims.

Having described my invention what I claim as new and desire to secure by Letters Patent is:

1. In a device of the class described, the combination with a body, of bearing runners mounted to reciprocate relatively to said body; stops carried by said runners and adapted to prevent retrograde movement thereof; and means for applying power to said runners through the medium of said stops, substantially as described.

2. In a device of the class described, the combination with a body, of bearing runners mounted to reciprocate relatively to said body; stops carried by said runners and adapted to prevent retrograde movement thereof; and means for applying power to said runners alternately through the medium of said stops, substantially as described.

3. In a device of the class described, the combination with a body, of bearing runners mounted to reciprocate relatively to said body; a series of stop dogs pivoted to each of said runners and adapted to prevent retrograde movement thereof; a bar slidable on each of said runners and connected to operate said dogs; and means on said body for applying power to said bars to reciprocate the same, substantially as described.

4. In a device of the class described, the combination with a body, of a pair of bearing runners mounted to reciprocate relatively to said body; a series of stop dogs pivoted to each of said runners and adapted to prevent retrograde movement thereof; a bar slidable on each of said runners and connected to operate said dogs; and means on said body for applying power to said bars alternately to reciprocate the same, substantially as described.

5. In a device of the class described, the combination with a body, of bearing runners mounted to reciprocate relatively to said body; supporting springs interposed between said runners and said body; buffer springs carried by said body and adapted to limit the movements of said runners in either direction; a crank shaft rotatably mounted in said body; an explosive engine adapted to rotate said shaft;

lever arms carried by said body and having an operative connection with said crank shaft; stop dogs pivoted on said runners and adapted to engage a bearing surface to prevent retrograde movement of said runners; and links connecting said lever arms and stop dogs, substantially as described.

In testimony whereof I have signed my name to this specification in the presence of two subscribing witnesses.

VINCENT BARTOS.

Witnesses:
 JOSHUA R. H. POTTS,
 W. C. SMITH.